117,889

UNITED STATES PATENT OFFICE.

VICTOR APOLLINARIS JAGIELSKI, OF LONDON, ENGLAND.

IMPROVEMENT IN DIETETIC COMPOUNDS FROM MILK.

Specification forming part of Letters Patent No. 117,889, dated August 8, 1871.

*To all whom it may concern:*

Be it known that I, VICTOR APOLLINARIS JAGIELSKI, M. D., of Weymouth street, Portland Place, London, England, a subject of the Emperor of Germany, have invented a Dietetic Remedy, of which the following is a specification:

The invention has for its object the manufacture of a new dietetic remedy, consisting of milk in a state of fermentation, which preparation I call "koumiss."

According to my experiments koumiss can be made of every kind of milk, but mares' milk is the only kind which produces koumiss without the necessity of a preadjustment of the quantitative relations of its components. It passes into vinous fermentation of its own accord, and gives the true koumiss, which is extremely useful in medicine; but mares' milk has a smell which resembles that of horse sweat, and the koumiss from it is characterized in degree by this odor; besides, mares' milk is so scarce and dear that it cannot be generally adopted. I have therefore been driven to make koumiss either from asses', goats', or cows' milk, which latter is the cheapest and most readily obtained. The substitution of asses', goats', or cows' milk for mares' milk enables us to have koumiss at our own homes, whereas if mares' milk only were employed it would be compulsory to go and drink it on the steppes of distant Tartary, as nowhere else are mares to be found in a sufficient number and condition for being milked advantageously. The amount of lactic sugar in these three species of milk, viz., asses', goats', and cows', is much smaller than in that of mares' milk; therefore all these kinds of milk need to be preadjusted very skillfully for the production of koumiss. There are many practical difficulties, besides, in the manufacture of artificial koumiss which my process, after my own study and experiments, will enable any one to surmount easily, and to produce a koumiss which, for therapeutic purposes, is the counterpart of that from mares' milk. I am also enabled to make from cows' milk koumiss of different modifications, as may be required for different diseases or constitutions.

The fermentation which milk undergoes by the process which converts it into koumiss presents many differences from those changes induced in milk by the ordinary methods of souring it. In all these cases lactic acid is formed, but in my fermentation process for the manufacture of koumiss that product is accompanied by other derivatives of milk which impart a peculiar character, physical as well as chemical, and which are not common to milk under ordinary circumstances. The chemical process consists in a decomposition of the lactic sugar into alcohol and carbonic acid, whereby, through the influence of microscopic organisms or germs in the presence of caseine, lactic acid is also formed. Cows' milk being, in its chemical composition, too poor in lactic sugar, its proportion of lactic sugar must be raised by adding to each quart of it a few grains. Again, the amount of caseine and butter in this milk must be appropriately reduced. The caseine is reduced by adding to every three quarts of good cows' milk, of about 1.030 to 1.035 specific gravity, one quart of pure water. The butter is reduced by skimming the milk after it has remained standing, from about twelve to twenty hours, in a clean locality of about 18° to 20° centigrade. The milk is skimmed later or sooner, according to the quantity of butter, fat, or cream it is desired to leave in it, but the temperature of the milk must not be raised too high, in order not to impair its fermentability.

Koumiss can be made of any consistency or compositions, according to the above rule; therefore, if the amount of caseine in the normal koumiss is too great for any individual case it must be replaced by another of less richness in that element.

I will describe hereafter four different kinds of koumiss prepared according to my invention:

First, the full cows'-milk koumiss; second, medium koumiss, or of mares' milk consistency; third, whey koumiss; fourth, diabetic koumiss.

It is necessary first to produce a ferment in order to produce a second ferment or koumiss which is only employed to produce the medicinal koumiss. A ferment may be prepared in various ways, but that which I have found to answer best is prepared in the following manner: I take one-quarter of a pound of fresh good German yeast, one ounce of pure honey, and two ounces of fine wheat flour; mix this well in a stone mortar, and then pour on a half pint of fresh milk, stirring the whole; let it stand about twelve hours, more or less, in a warm place at about 30° centigrade. After this I take the dough and put it into a clean piece of well-washed coarse muslin, bind the muslin over the dough with a clean linen tape, and put the bundle into a wooden vessel thoroughly soaked for many days in clean water and containing a quart of fresh milk. I then twirl or agitate the fluid with a twirl-stick or wooden egg-beater till the milk begins to foam. The twirl-stick should not be removed from the vessel during the process, and the vessel should be well covered with linen, through the center of which the twirl-stick should pass. I repeat this from hour to hour, each time for about fifteen minutes, till the foam begins to rise very high; this is the moment to add another quart of fresh milk and one quart of water, so that the whole may attain the temperature of about 20° centigrade. When the foam rises high I then continue to beat or twirl more slowly. After two or three days oxidation will be complete; then this koumiss ferment may be strained through a well-washed muslin strainer. It will give a strong peculiar smell of vinous fermentation and an acidulous prickly taste. I then fill it into strong champagne-bottles, into each of which I put about five grains of grape or cane sugar. These bottles should be well corked, and after two or three days the contents or ferment may be used for making the medicinal koumiss in the following way, taking care to avoid pouring out any deposit which may have collected in the bottles. The room in which the medicinal koumiss is to be prepared must be maintained at about from 18° to 20° centigrade, and must be provided with a plentiful supply of hot and cold water and with a sink. In the preparation of medicinal koumiss the koumiss and ferment must be prevented from coming into contact with any metal. The milk to be used should be of specific gravity from 1.030 to 1.033, and should be placed in shallow glass or earthenware pans. After allowing the milk to stand a few hours, according to its temperature, the cream must be skimmed off until only about three or four per cent. is left. I take half of this milk and pour it into a churn which has been well cleaned with clear cold water and rubbed with a dry linen cloth, but not flannel; no soda or other material than water ought to be used in cleaning the churn. I now add water to the milk in the churn in the proportion of one volume of water to three of milk, taking care that the water shall be of such a temperature as to raise the contents of the churn to about 18° centigrade. I add the contents of one champagne-bottle of ferment to every four quarts of milk; lactic sugar, previously dissolved in boiling water, is added to the milk in the proportion of half an ounce of lactic sugar to four quarts of milk. Immediately the ferment is added to the milk vigorous churning must begin and the churning must be continued for about half an hour; then stop and let it stand and ferment by itself for about one hour. I then pour into the churn the second half of the milk, with a similar proportion of water and lactic sugar, and at a similar temperature to that above mentioned, and churn it as before without interruption for about two or more hours till the foam becomes stronger and the bubbles larger than before. The taste now loses its sweetness and partakes of an acidulous sweet taste with a faint trace of the flavor of sweet almonds. The churning is to be stopped directly a high metallic sound is noticed, or any small granular particles appear on the bubbles, or when the foam begins to fall and the smell is stronger. The bubbles should never be allowed to show any caseine clots or butteraceous appearance, but the whole mass should present a milky and homogeneous appearance. To produce a well-sparkling koumiss, grape or cane sugar is to be added in about the proportion of about half a pound of sugar to every six quarts of the koumiss, the sugar being previously dissolved in hot water, and the quantity of sugar being regulated so as to raise the specific gravity of the koumiss to about 1.033 to 1.035. After the sugar has been added as above, the churning is continued for about five minutes. Any flavor, in the form of essence or aromatic or essential water, may be added with the sugar, and, if desired, any suitable drug or chemical ingredient may be added either at this moment or with each bottle separately. The koumiss, after the churning is complete, must be allowed to stand for about a quarter of an hour; it is then to be strained and emptied into a vessel from which it can be drawn into the bottles. If any residuum should be observed in the strainer it is a sign that the operation has been faulty in some particular, and this must be avoided as much as possible.

The bottles should not be completely filled with the koumiss, but the space of about two ounces should be left to allow for the carbonic-acid gas developed. The bottles should be perfectly clean and rinsed out with clean water, and no shot, soda, or dirt should be left in them. After the bottles are filled with the koumiss, as above mentioned, they should be tightly corked, wired, and sealed in the usual way. The bottles should be labeled and dated, in order to distinguish its quality or number, and they should be kept in a cool place—No. 1 koumiss being that which has been bottled from one to five days; No. 2 koumiss being that which has been bottled from five to fifteen days; and No. 3 for a longer period than fifteen days and till it is about three months old. The colder the temperature of the place in which the koumiss is kept the longer will it keep. No. 1 koumiss sparkles but very little, and can be drawn from the bottle by simply withdrawing the cork; Nos. 2 and 3 can only be drawn by a tap passed through the cork.

For the medium koumiss, or koumiss of mares' milk consistency, the process is nearly the same as in the previous case, except that in this case no water is used, but I mix whey with the milk. The caseine in this imitation koumiss should be equal or a little more than equal to the quantity in the koumiss of mares' milk. The basis milk for the preparation of such a koumiss must assimilate in composition. Therefore, to mares' milk the amount of butter and caseine in the cows' milk which is to be used must be appropriately reduced. On the other hand, its proportion of lactic sugar must be raised, and in both cases without diminishing the quantity of the phosphates, albumen, and the other valuable constituents. The cows' milk, therefore, I dilute with whey, a liquid which is free from butter and caseine, and which does not disturb the quantitative relations of the sugar and the salts of the cows' milk. Two volumes of whey are added to one volume of fresh milk. The proportionate amount of butter will be reduced by this admixture to about 1.5 to 1.8 per cent., and that of the caseine to about 1.4 to 1.8 per cent.; but an addition of lactic sugar is required in order to raise the amount of sugar from six to seven per cent. The greatest care must be taken in the preparation of whey for the above purpose.

There are many methods of curdling milk, but I have found the best results when employing the spontaneous curdling, and the mode of proceeding is as follows: I leave the milk at repose for about twenty-four hours in a constant temperature of about 20° centigrade, (68° Fahrenheit.) During this interval a small quantity of lactic acid is developed, but the milk gives almost a neutral reaction. By now raising the temperature to about 40° or 45° centigrade (104° or 113° Fahrenheit) the caseine separates in one large lump. The whole is then poured upon a fine hair sieve in order to strain off the whey in a clear state. The remaining caseine is then to be put into a strong linen cloth and squeezed, for the separation of the small portion of whey which it still retains. This latter portion of whey being mixed with the previous portion the whole is allowed to cool down to about 20° centigrade. Lactic sugar is now added to the whey in the requisite proportion of about thirty-five grains to the imperial quart. The whey thus prepared is then to be mixed with the fresh milk in the aforesaid proportions. The ferment is now to be added, as in the first instance; or any good sparkling koumiss of three or four days standing may be employed, but instead of dividing the liquid into two parts, as before, I prefer to operate upon the entire quantity at once at the temperature of about 18° to 20° centigrade. The churning is to go on continuously while mixing the ingredients, and after the ingredients have been mixed for from about two to four hours, when, without the appearance of the signs indicated with respect to the first process, the koumiss must be at once bottled. Grape or cane sugar is added in desired proportion, according to taste, degree of sparkling, or specific gravity required, which should be as in the first case. This koumiss, when properly prepared, will be thoroughly homogeneous, and will be entirely free from any hard granular caseine.

For the preparation of whey koumiss I proceed in the following manner: For this purpose I employ whey prepared in any suitable manner, to which I add a ferment in the same proportions as before mentioned, such ferment being freed from caseine. The whey, with the ferment and the addition of lactic sugar in the previous proportions, but without the addition of water or milk, is churned as before until the taste thereof becomes slightly acidulous, when it is mixed with grape or cane-sugar in any desired proportion and at once bottled.

The diabetic koumiss is prepared from buttermilk, or from thoroughly-skimmed sour milk in its fluid state, without the addition of any grape or cane sugar, and only half the previous proportion of lactic sugar, in order to produce a greater proportion of lactic acid. This koumiss does not sparkle so easily as those before mentioned, therefore the cork can be drawn from the bottle. If, however, it is required to be sparkling, then a few grains of cane or grape sugar may be added to each bottle, which sugar soon decomposes into alcohol and carbonic acid.

The various kinds of koumiss before mentioned, after remaining still in the bottles a short time, will separate into three layers; but on shaking the bottles this entirely disappears and the koumiss becomes again thoroughly homogeneous.

The churn which I prefer to employ is the old-fashioned upright wooden churn, having the top thereof capable of removal, and having the hoop rising to a height above the cover of about six or eight inches. The cover should be concave on its upper surface and provided with three holes, one for the churn-stick, the others for the admission of air, such holes being about one inch in diameter and being covered with coarse muslin. As many holes as possible, each of about one inch diameter, should be made in the churning-disk. I do not, however, confine myself to this precise description of churn, nor do I claim it as forming any part of my invention.

The churn should be thoroughly soaked in water of about 15° to 17° centigrade till the water therein becomes completely clear, even after standing for twenty-four hours. Boiling or warm water should never be used in cleaning the churn. The churn must never be allowed to stand with its cover on after it has been used for the preparation of koumiss.

Having thus described the nature of my said invention and the mode in which I carry the same into effect, I would have it understood that what I do claim is—

The manufacture of a dietetic remedy or artificial koumiss of the various modifications herein described from milk by the addition of a ferment and other materials, according to the process substantially as herein described.

V. JAGIELSKI, M. D.

Witnesses:
  FREDK. HARRIS,
  B. J. B. MILLS,
    *Both of 35 Southampton Buildings, London.*